UNITED STATES PATENT OFFICE.

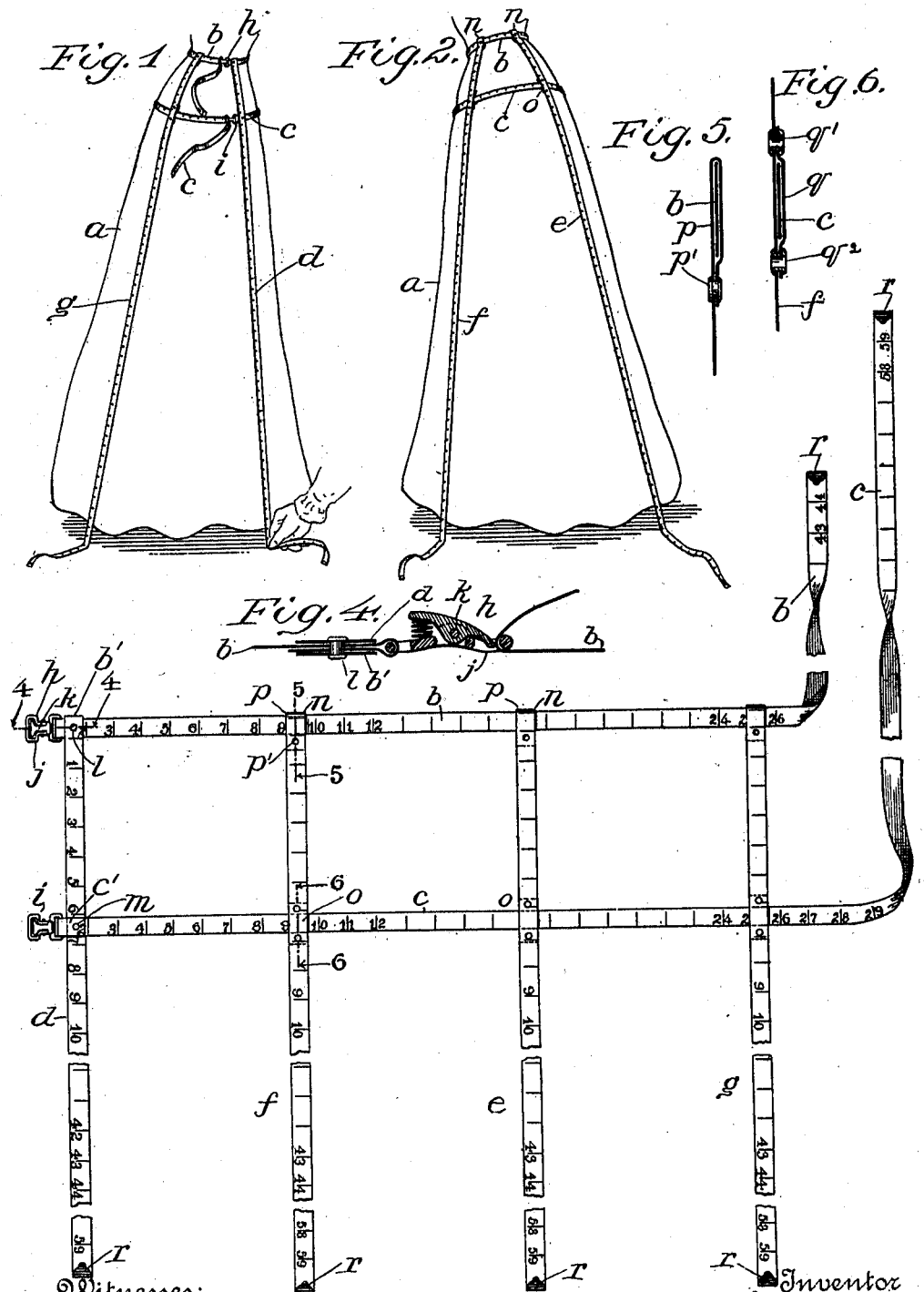

ABRAHAM WURTZEL, OF NEW YORK, N. Y.

MEASURING APPLIANCE.

988,683.     Specification of Letters Patent.     Patented Apr. 4, 1911.

Application filed April 28, 1910. Serial No. 558,203.

*To all whom it may concern:*

Be it known that I, ABRAHAM WURTZEL, a citizen of the United States, residing in the city of New York, borough of Manhattan, county and State of New York, have invented certain new and useful Improvements in Measuring Appliances, of which the following is a specification.

This invention relates to measuring appliances which may be applied to the human form for the purpose of obtaining the various measurements required for a skirt or for a similar article of apparel.

Another object of the invention is to provide a series of connected measures, each of which is used for obtaining a measurement of the form along a different line from the other measures; and a further object of the invention is to provide a measuring appliance which is simple and efficient and which is especially adapted for use by a person desiring to make their own measurements for a skirt or other articles of apparel, the dimensions for which are to be measured.

These being some of the objects in view, my invention consists of certain novel features of construction and combinations of parts to be hereinafter described and then particularly pointed out in the claim, reference being had to the accompanying drawings showing a desirable form of the invention, and in which—

Figure 1 is a front perspective view showing the improved measuring appliance in position upon the form; Fig. 2 is a rear perspective view of the measuring device upon the form; Fig. 3 is an elevation of the measuring device, parts of the measures being shown as broken out because of the length thereof; Fig. 4 is an enlarged longitudinal section on the line 4—4, Fig. 3, showing one of the buckles and how it is attached to the end of one of the measures, and how it engages with the opposite end of said measure; Fig. 5 is an enlarged section on the line 5—5, Fig. 3, and showing one of the adjustable or variable connections between two of the measures; and Fig. 6 is an enlarged section on the line 6—6, Fig. 3, showing another of the adjustable or variable connections between two of the measures.

Referring to the drawings, the form $a$ is indicated by an outline which defines the skirt and a portion of the waist. The measuring appliance preferably comprises six measures, such for instance as tape measures, and are as follows:—a waist measure $b$, a hip measure $c$, a front measure $d$, a back measure $e$, and two side measures $f$ and $g$ respectively. The waist measure $b$ and the hip measure $e$ are of sufficient length to take in most any size, and the other measures are of sufficient length to take in most any length of skirt or other article of apparel to be measured for.

The two measures $b$ and $c$ for the waist and hips respectively are so arranged in the measuring appliance as to extend parallel with each other, while the other measures $d$, $e$, $f$ and $g$ extend laterally from said waist and hip measures $b$ and $c$ and are parallel with each other. The ends of the waist and hip measures $b$ and $c$ are provided with buckles $h$ and $i$ respectively. Each buckle is preferably of the grip-jaw type such as is used on leather straps. Buckle $h$, being the same as buckle $i$, is shown more clearly in detail in Fig. 4, and comprises a suitable frame $j$, to one end of which one end of the measure $b$ is attached, said frame being provided with a spring actuated grip jaw $k$, the end of which is adapted to coöperate with the opposite end of the frame $j$ for the purpose of gripping and holding the free end of the waist measure $b$ which may be slipped through the buckle. The friction grip afforded by the buckle such as described, enables the free end of the measure attached thereto to be slipped to any position in the buckle by engaging the said free end with said buckle and then pulling on said end so that it will be automatically and frictionally held in position, whereby an exact measurement can be obtained. Preferably the graduations upon the waist and hip measures $b$ and $c$ start with the second unit of measurement adopted for the measure. The first unit of measurement is approximately equal to that of the distance between the end of the measure where it is looped over the buckle frame and the gripping end of the jaw $k$ of the buckle. The unit of measurement adopted and shown on the drawings is one inch, but it is obvious that other units of measurement can be used. There are of course sub-divisions for each unit of measurement, but these cannot readily be indicated on the drawings.

The front measure $d$ preferably has a fixed and definite relation with respect to the waist and hip measures $b$ and $c$, but this is not absolutely necessary although desirable. In the drawings the said front measure $d$ is shown as attached to the buckle ends of the measures $b$ and $c$ at the second graduation of the unit of measurement adopted, so that said attachment is adjacent the buckles. This attachment is secured by means of preferably metallic eyelets $l$ and $m$ which pass through the loops $b'$ and $c'$ of the measures which engage the buckles $h$, $i$, and through the said front measure $d$ which lies within said loops. It will be seen, therefore, that the waist measure $b$, the hip measure $c$ and the front measure $d$ are thereby connected in fixed relationship, and that a protruding end is furnished by the attached buckle corresponding substantially with one unit of measurement, so that the desired measurement can be readily and nicely secured.

The back measure $e$ and also the side measures $f$ and $g$ are so combined with the waist and hip measures $b$ and $c$ that they may be variably connected with the same as by means of sliding connections $n$, $o$ for each of said measures. Each variable or adjustable connection is shown in detail in Figs. 5 and 6 respectively. In Fig. 5 is shown the connection with the waist measure $b$ and the same consists of a loop $p$ formed in one end of each of said measures $e$, $f$, $g$, through which passes the waist measure $b$, the extremity of said loop being secured to the body of its measure as by means of a metallic eyelet $p'$. It will be observed that the graduations on each of the measures $e$, $f$, $g$ commence at the loops $p$, the first graduation being in line with the lower edge of the waist measure so that proper measurement can be obtained by said measures $e$, $f$, $g$. The variable or sliding connection between the hip measure $c$ and the measures $e$, $f$, $g$ is shown in Fig. 6 and is formed by means of a short strip $q$ which crosses the hip measure, the ends of said strip being secured as by metallic eyelets $q'$, $q^2$ to the appropriate measure, be it $e$, $f$ or $g$.

From the described form of variable connection of the back and side measures with the waist and hip measures, it is obvious that either of said three measures $e$, $f$, $g$ may be positioned or adjusted upon the waist and hip measures at any desired point, and that the said three measures may be differently spaced relatively to each other and relatively to the front measure $d$. The free end of each of the measures is preferably reinforced as by a metallic tip $r$.

In using my improved measuring appliance, the same is draped over the form to be measured. In the present instance the measuring appliance is especially adapted for obtaining the measurements for skirts, and this being the case the upper measure $b$ for the waist is passed around the waist so as to locate the permanently attached front measure $d$ at proper position in the front, and then the free end of said waist measure $b$ is slidingly engaged with the buckle $h$ so that it may be automatically gripped by the jaw $k$ when the proper measurement is obtained. In like manner the measurement of the hips is obtained by the lower measure $c$. The four measures $d$, $e$, $f$ and $g$ will now be supported from the waist and hips by the measures $b$ and $c$. The front measure $d$ having already been properly positioned at the front, said front measurement is obtained by pulling said measure $d$ straight down to the floor, and the proper allowance is made for the desired length of skirt at front in usual manner. Only one hand is necessary in obtaining said front or any other linear measurement, as the upper end of said measure $d$ is fixed to and supported by the waist and hip measures. The measure $e$ is now adjusted or slid upon the waist and hip measures $b$, $c$ relative to the permanently attached front measure so as to bring it to proper position, and so that the back measurement may be obtained in the same manner as was the front measurement. The side measures $f$ and $g$ are now adjusted to proper position upon the waist and hip measures so that the side measurements can be obtained.

What I claim as new and desire to secure by Letters Patent is,—

In a measuring appliance, the combination of a waist tape-measure provided with a friction-grip buckle at one end, said measure being graduated, a hip tape-measure provided with a friction-grip buckle at one end, said measure being also graduated, and each of said buckles having its gripping portion located at the outer end of the buckle at a point corresponding with one of the units of the measure to which the buckle is attached, a plurality of single vertical measures one of which is permanently secured to said waist and hip measures at the second units of measurement thereof adjacent said buckles, while the others are slidingly supported by said waist and hip measures, the first graduation of each of said vertical measures commencing at the inner edge of said waist tape-measure, and loops at the back of said vertical measures through which said hip tape-measure passes.

ABRAHAM WURTZEL.

Witnesses:
C. G. BURDINE,
GEO. L. WHEELOCK.

---

Copies of this patent may be obtained for five cents each, by addressing the "Commissioner of Patents, Washington, D. C."